United States Patent [19]

Massetti et al.

[11] Patent Number: 5,850,249
[45] Date of Patent: Dec. 15, 1998

[54] RECEIVER MONITORING SYSTEM WITH LOCAL ENCODING

[75] Inventors: Enrico Massetti, Dunedin, Fla.; Kenneth L. Straub, Altanta, Ga.

[73] Assignee: Nielsen Media Research, Inc., New York, N.Y.

[21] Appl. No.: 542,177

[22] Filed: Oct. 12, 1995

[51] Int. Cl.$^6$ .................................................. H04N 7/087
[52] U.S. Cl. ...................................... 348/1; 348/2; 455/2
[58] Field of Search ................................. 348/1, 2, 5, 10; 455/2, 3.1, 56.1, 67.1; H04N 7/087

[56] References Cited

U.S. PATENT DOCUMENTS

| | | | |
|---|---|---|---|
| 5,319,453 | 6/1994 | Copriviza et al. | 348/6 |
| 5,382,970 | 1/1995 | Kiefl | 348/1 |
| 5,404,160 | 4/1995 | Schober et al. | 348/1 |
| 5,526,427 | 6/1996 | Thomas et al. | 380/20 |
| 5,532,732 | 7/1996 | Yuen et al. | 348/1 |
| 5,585,865 | 12/1996 | Amano et al. | 348/731 |

*Primary Examiner*—Glenton B. Burgess
*Attorney, Agent, or Firm*—Marshall, O'Toole, Gerstein, Murray & Borun

[57] ABSTRACT

An audience measurement system meters tuning of a receiver which receives a plurality of program signals transmitted over a plurality of channels. The receiver is located in an audience site within a dwelling, and the plurality of program signals enter the dwelling through a service entrance and are supplied therefrom to the audience site. The audience measurement system includes a code inserter, a decoder, and a home unit. The code inserter inserts a local code in each of the program signals at a location which is intermediate the service entrance and the audience site. This local code includes a unique local code inserter ID and a code inserter time stamp. The decoder decodes the unique local code inserter ID and the code inserter time stamp at the audience site. The home unit is located in the dwelling and collects and stores the decoded unique local code inserter ID and code inserter time stamp.

64 Claims, 6 Drawing Sheets

RECEIVER MONITORING SYSTEM WITH LOCAL ENCODING

FIELD OF THE INVENTION

The present invention relates to an apparatus and a method for determining those television or radio programs which are selected for viewing or listening by one or more panel members whose viewing or listening habits are being monitored.

DESCRIPTION OF THE PRIOR ART

Various systems have been developed for determining the broadcast programs or channels to which receivers have been tuned by panel members of selected households. In one such system, which is generally referred to as a signal injection system, an easily detected labelling signal is commonly "injected" in a predetermined sequence into each of a plurality of receivable signals to which a sampled receiver may be tuned. This labelling signal is normally injected into the sampled receiver, and the determination of the channel frequency to which the sampled receiver has been tuned is made when the injected signal is detected in the output of the tuner.

Signal injection systems are taught by Porter in U.S. Pat. No. 4,044,376, and by Thomson in U.S. Pat. No. 4,058,829. In the signal injection systems which are taught by Porter and Thomson, the antenna input of a sampled receiver is switched between an antenna and the output of an RF oscillator. The frequency of the RF oscillator is stepped through the channel frequencies of each receivable television signal. Thus, a signal from the RF oscillator is injected into each channel which carries a television signal. This injection signal is injected during the vertical blanking interval of each receivable television signal.

Another signal injection system is taught by Ishman, et al. in U.S. Pat. No. 4,216,497 and in U.S. Pat. No. 4,388,644. As disclosed in these patents, injection signals at the possible channel frequencies to which a receiver may be tuned are injected into the receiver until an injection signal is detected in an output of the receiver. Once the injection signal having the channel frequency to which the receiver is tuned is detected in an output of the receiver, injection signals at only that channel frequency are periodically injected into the receiver. Upon a failure to detect one of these periodically injected signals at an output of the receiver, three additional attempts are made. If all four attempts fail, a new search is made to find the new channel frequency to which the receiver is tuned.

Still another signal injection system is taught in U.S. Pat. No. 4,605,958 by Machnik et al. As taught in this patent, cable television signals are passed through a cable meter and are then passed to a cable converter. From the cable converter, the television signals are looped back through the cable meter before being applied to the input of a television receiver. The cable meter includes video switches which are operated to momentarily disconnect the television signals from the cable converter and from the television receiver. While the televisions signals are disconnected from the cable converter and from the television receiver, the cable meter supplies to the cable converter with an injection signal at one of the frequencies to which the cable converter may be tuned. If the cable converter is tuned to that cable channel, the injection signal passes through the cable converter and returns back to the cable meter. If the cable converter is not tuned to that cable channel, the injection signal does not pass through the cable converter and does not return back to the cable meter. Thus, by sensing when the injection signal passes through the cable converter and back to the cable meter, the cable meter is able to determine the channel to which the cable converter is tuned. Because the output of the cable converter is routed through the cable meter before it is supplied to the television receiver, the injection signal may be prevented from reaching the television receiver and interfering with reception.

Yet another signal injection system is taught in published international application Pub. No. WO 94/10799 by Mostafa et al. As taught in this published patent application, a signal generator sweeps through the possible channel frequencies to which a cable converter and a VCR may be tuned. If a channel frequency has been selected by the cable converter and/or the VCR, a corresponding channel detection signal passes through the cable converter and/or VCR to thus identify the tuned channel frequency. Thereafter, an identification code at the frequency of the selected channel frequency is injected into the overscan region of the active video. This identification code includes the channel number of the selected channel frequency, the time of injection, and the serial number of the injector device. Thus, for example, the recorded channel may be determined during playback on the recording VCR, or during playback on another VCR, which is connected to the same or to a different television receiver in the metered household.

Systems for determining which programs are broadcast are also known. In such systems, ancillary source identification codes have been added to programs so that, when the programs are broadcast, the ancillary source identification codes are transmitted along with the programs. Thus, these ancillary source identification codes may be detected in order to identify which programs have been broadcast. Ancillary source identification codes commonly include data to identify the originator of the program and the time at which the program was broadcast. Ancillary source identification codes may also include other data such as the time and source of re-broadcasts of tape delayed programs.

One such system for adding ancillary source identification codes to television program signals is taught in U.S. Pat. No. 4,025,851 by Haselwood et al. In this system, usually referred to as the AMOL system, a network source identification code is written on selected fields and lines of the vertical blanking interval of the television program signal. Although systems of this sort are widely used to verify that affiliated local stations have broadcast a network's programs at corresponding scheduled times, these systems have not commonly been used for "metering" television tuning in metered households because ancillary source identification codes inserted into television program signals during vertical blanking interval are generally decipherable only from strong, ghost-free signals, and because strong, ghost-free signals are not available at all metered, randomly selected households.

Another system for adding ancillary source identification codes to television program signals is taught by Crosby in U.S. Pat. No. 3,845,391. In this system, a nominally sub-audible ancillary source identification code is hidden in the audio portion of a radio broadcast. However, signal interference (e.g., audibility of the supposedly sub-audible ancillary source identification code) has limited or prevented the use of such sub-audible ancillary source identification codes.

Furthermore, television audience measurements are commonly reported with a temporal precision of one minute or less so that the value of short program elements (e.g., commercials embedded in a program at the time of origination) can be detected. This temporal precision requires that timing devices (e.g., timers or clocks) of the metering equipment in the "metered households" be accurately synchronized and that the television audience measurement system accommodates timing devices which have timing functions that drift with respect to a standard time reference.

One known system for providing the requisite synchronization between the timing devices of television audience measurement systems and a standard time reference went into initial commercial service in 1972 and employs a single local controller in the metering equipment of each metered household and a tuning transducer attached to each metered television receiver. The local controllers include timers which are reset each time that the local controller communicates with a central office computer and which accumulate counts from the time of reset. The local controllers "time stamp" tuning data by storing timer counts with the tuning data. The local controllers communicate the tuning data with the timer counts to the central office computer once per day. The central office computer, which has a time base traceable to a national standard time signal, uses the time counts from each metered household, uses the reset times, and uses the national time standard in order to interpolate the time at which each tuning event occurred.

Another system for providing the requisite synchronization between the timing devices of television audience measurement systems and a standard time reference is disclosed by Waechter et al., in U.S. Pat. No. 4,943,963. This patent teaches a method of setting clocks located in metering equipment at metered television receivers. The metering equipment communicates by way of a local area network with an in-home data collection unit that stores and forwards tuning and timing data to a central office.

Yet another system for providing the requisite synchronization between the timing devices of television audience measurement systems and a standard time reference is disclosed by Wuethrich in EP 598682. This publication teaches a broadcast audience measurement system in which portable equipment having local timing devices collect tuning data. Each local timing device is synchronized whenever it is plugged into local tuning data store-and-forward equipment.

SUMMARY OF THE INVENTION

In accordance with one aspect of the present invention, an audience measurement system meters tuning of a receiver which receives a plurality of program signals transmitted over a plurality of channels. The receiver is located at an audience site within a dwelling, and the plurality of program signals enter the dwelling at a service entrance and are supplied therefrom to the audience site. The audience measurement system includes a code inserter, a decoder, and a data collector and memory. The code inserter inserts a code in each of the program signals at a location which is intermediate the service entrance and the audience site. The code includes a unique local code inserter ID and a code inserter time stamp. The decoder decodes the unique local code inserter ID and the code inserter time stamp at the audience site. The data collector and memory is located within the dwelling and collects and stores the decoded unique local code inserter ID and code inserter time stamp. The collector and memory communicates the decoded unique local code inserter ID and code inserter time stamp to a remote site.

In accordance with another aspect of the present invention, an audience measurement system meters tuning of a receiver. The receiver receives a first plurality of program signals transmitted over a plurality of channels and a second plurality of program signals transmitted over a plurality of channels. The receiver is located at a first audience site within a dwelling. The first plurality of program signals enters the dwelling through a first service entrance and is supplied therefrom to the audience site. The second plurality of program signals enters the dwelling through a second service entrance and is supplied therefrom to the audience site. The audience measurement system includes first and second code inserters, a decoder, and a data collector and memory. The first code inserter inserts a code in each of the first plurality of program signals at a location which is intermediate the first service entrance and the audience site. The code inserted by the first code inserter includes a corresponding unique local code inserter ID and a corresponding code inserter time stamp. The second code inserter inserts a code in each of the second plurality of program signals at a location which is intermediate the second service entrance and the audience site. The code inserted by the second code inserter includes a corresponding unique local code inserter ID and a corresponding code inserter time stamp. The decoder is located at the audience site and decodes the unique code inserter IDs and the code inserter time stamps corresponding to the codes inserted by the first and second code inserters. The data collector and memory is located within the dwelling and collects and stores the decoded unique code inserter IDs and code inserter time stamps corresponding to the codes inserted by the first and second code inserters. The data collector and memory communicates the decoded unique code inserter IDs and code inserter time stamps corresponding to the codes inserted by the first and second code inserters to a remote site.

In accordance with still another aspect of the present invention, an audience measurement system meters tuning of first and second receivers. The first receiver receives a first plurality of program signals transmitted over a plurality of channels, and the second receiver receives a second plurality of program signals transmitted over a plurality of channels. The first receiver is located at a first audience site within a dwelling, and the second receiver is located at a second audience site within the dwelling. The first and second pluralities of program signals enter the dwelling through a service entrance and are supplied therefrom to the first and second audience sites. The audience measurement system includes a code inserter, a decoder, and a data collector and memory. The code inserter inserts a code in each program signal of the first and second pluralities of program signals at a location which is intermediate the service entrance and the first and second audience sites. The code inserted by the code inserter includes a corresponding unique local code inserter ID and a corresponding code inserter time stamp. The decoder is located at the first and second audience sites and decodes the unique code inserter IDs and the code inserter time stamps corresponding to the codes inserted by the code inserter. The data collector and memory is located within the dwelling and collects and stores the decoded unique code inserter IDs and code inserter time stamps corresponding to the codes inserted by the code inserter, and communicates the decoded unique code inserter IDs and code inserter time stamps corresponding to the codes inserted by the code inserter to a remote site.

In accordance with yet another aspect of the present invention, an audience measurement system meters tuning of a receiver. The receiver receives a plurality of program signals which are transmitted over a plurality of channels and which are encoded with source identification codes, and the receiver is located at an audience site within a dwelling. The plurality of program signals enter the dwelling at a service entrance and are supplied therefrom to the audience site. The audience measurement system includes a memory, a tuner, a decoder, and a comparator. The memory stores a line-up list. The line-up list links source identification codes with corresponding channel data. The tuner tunes a predetermined channel. The decoder decodes a source identification code from a signal on the predetermined channel. The comparator compares a first channel datum from the line-up list with a second channel datum denoting the predetermined channel. The first channel datum denotes a channel corresponding to the source identification code. The comparator replaces the first channel datum with the second channel datum if the first and second channel data differ.

In accordance with an additional aspect of the present invention, an audience measurement system meters tuning of first and second receivers. The first and second receivers receive a plurality of program signals which are transmitted over a plurality of channels and which are encoded with source identification codes, and the first and second receivers are located at corresponding first and second audience sites within corresponding first and second dwellings. The plurality of program signals enter the first and second dwellings at service entrances and are supplied therefrom to the first and second audience sites. The audience measurement system includes a memory, first and second tuners, first and second decoders, and a comparator. The memory stores a line-up list. The line-up list links source identification codes with corresponding channel data. The first tuner tunes a predetermined channel, and the first tuner is located within the first dwelling. The first decoder decodes a source identification code from a signal on the predetermined channel tuned by the first tuner, and the first decoder is located within the first dwelling. The second tuner tunes a predetermined channel, and the second tuner is located within the second dwelling. The second decoder decodes a source identification code from a signal on the predetermined channel tuned by the second tuning means, and the second decoder is located within the second dwelling. The comparator compares a first channel datum from the line-up list with a second channel datum denoting the predetermined channel tuned by the first tuner, and also compares a third channel datum from the line-up list with a fourth channel datum denoting the predetermined channel tuned by the second tuner. The first channel datum denotes a channel corresponding to a source identification code, and the third channel datum denotes a channel corresponding to a source identification code. The comparator replaces the first channel datum with the second channel datum if the first and second channel data differ, and also replaces the third channel datum with the fourth channel datum if the third and fourth channel data differ.

In accordance with yet a further aspect of the present invention, a method of determining to which signal of a plurality of signals a receiver in a statistically selected dwelling is tuned, wherein the dwelling has a service entrance at which a plurality of channels carrying the plurality of signals enter the dwelling, and wherein each signal of the plurality of signals is transmitted with a corresponding source identification code includes the steps of (i) storing a set of paired records, wherein a first record of each of the paired records comprises a source identification code, and wherein the second record of each of the paired records comprises a corresponding channel designation, (ii) inserting a local code in each of the plurality of signals at the service entrance, wherein each local code comprises a channel designation uniquely associated with the channel carrying a corresponding signal, (iii) decoding the source identification code and the local code from signal to which the receiver is tuned, (iv) comparing the decoded source identification code with each of the first records of each set of paired records to find a matching first record, and (v) replacing the second record corresponding to a matched first record with the channel designation of the decoded local code if the second record corresponding to the matched first record does not match the channel designation of the decoded local code.

BRIEF DESCRIPTION OF THE DRAWINGS

These and other features and advantages will become more apparent from a detailed consideration of the invention when taken in conjunction with the drawings in which.

DETAILED DESCRIPTION OF THE INVENTION

Figure 1:
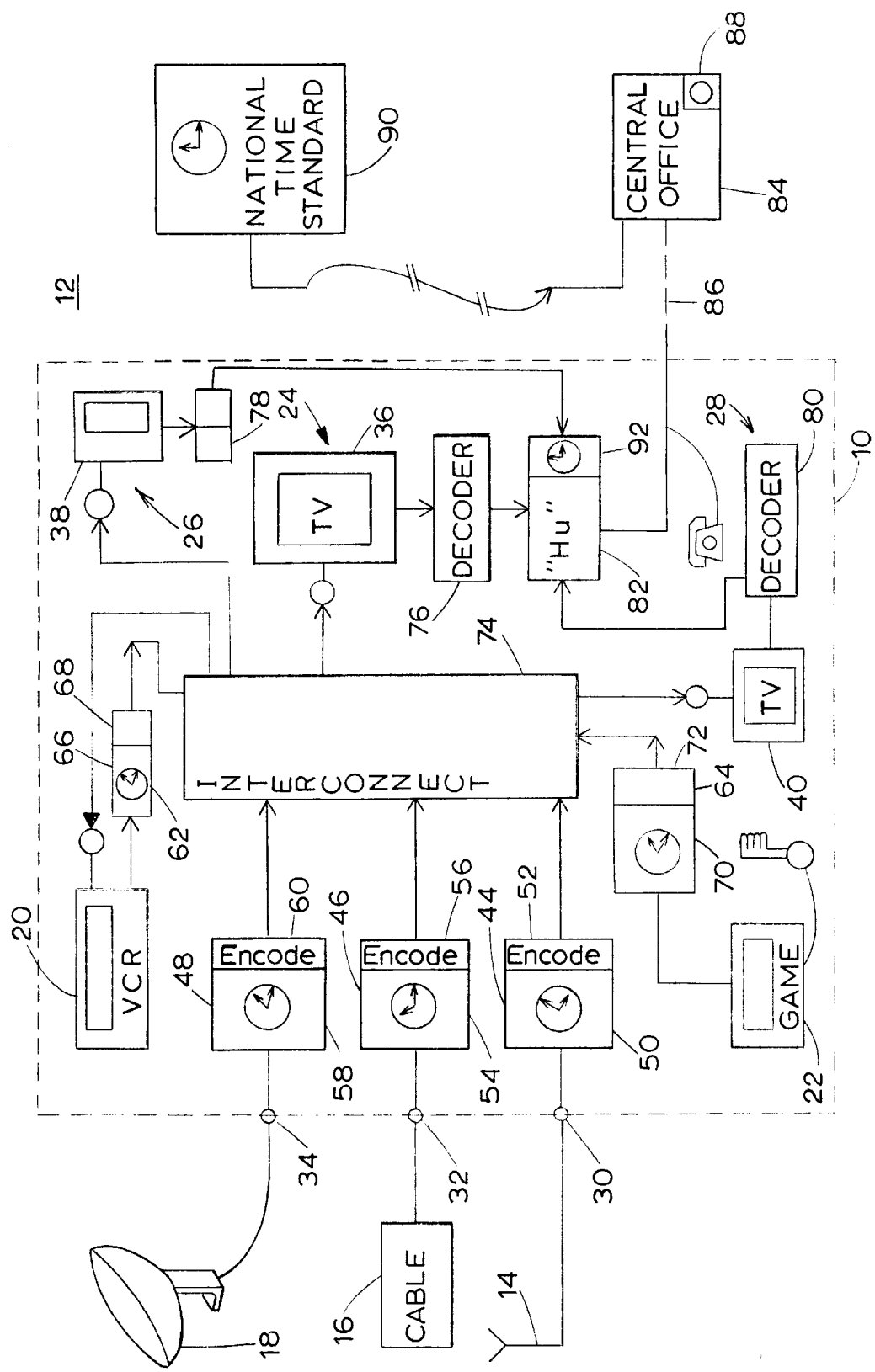
FIG. 1 is a schematic block diagram showing the elements of an in-home television tuning measurement system according to the present invention.

As shown in FIG. 1, an in-home television tuning measurement system 10 is installed in a metered, statistically selected dwelling 12 so that on-going television audience measurements may be conducted with respect to the viewing habits of those who reside in the metered, statistically selected dwelling 12. Television signals may feed into the metered, statistically selected dwelling 12 from a variety of external television signal sources by way of a variety of television signal inputs, such as an antenna input 14, a cable input 16, and a satellite receiver input 18. Internal television signal sources, such as a video cassette recorder 20 and a video game 22, may also supply television signals in the metered, statistically selected dwelling 12. The television signals supplied by external and internal television signal sources may be supplied to one or more viewing sites, such as viewing sites 24, 26, and 28, which are located within the metered, statistically selected dwelling 12. A viewing site may be referred to more generally as an audience site, i.e. a site at which an audience enjoys a program by way of a television receiver.

Most external television signal sources have corresponding service entrances 30, 32, and 34 at which their corresponding television signals feed into the metered, statistically selected dwelling 12. For example, the service entrance 30 receives a television signal which is transmitted over the air and which is received by the antenna input 14, the service entrance 32 receives a television signal which is transmitted over a cable and which is received by the cable input 16, and the service entrance 34 receives a television signal which is transmitted from a satellite and which is received by the satellite receiver input 18. In these cases, the television signals are brought into the metered, statistically selected dwelling 12 at the corresponding service entrances 30, 32, and 34 and are then split into a number of separate internal feeds to various viewing sites such as the viewing sites 24, 26, and 28. The only important exception is in those cases where over-the-air television signals are received by way of a small antenna, such as a set of rabbit ears, connected directly to a television receiver such as any of the television receivers 36, 38, and 40 located in corresponding viewing sites 24, 26, and 28.

A local code inserter 44 is connected to the service entrance 30, a local code inserter 46 is connected to the service entrance 32, and a local code inserter 48 is connected to the service entrance 34. The local code inserter 44 includes a timing device 50, such as a timer or clock, and an encoding device 52. The local code inserter 46 includes a timing device 54, such as a timer or clock, and an encoding device 56. The local code inserter 48 includes a timing device 58, such as a timer or clock, and an encoding device 60. Accordingly, the local code inserters 44, 46, and 48 are located at or near their corresponding service entrances 30, 32, and 34. That is, the local code inserters 44, 46, and 48 are located between (i) their corresponding television signal inputs, such as the antenna input 14, the cable input 16, and the satellite receiver input 18, and (ii) any point within the metered, statistically selected dwelling 12 where the television signals may be split into plural signal paths so as to provide signals to plural viewing sites, such as the viewing sites 24, 26, and 28.

A local code inserter is also associated with each internal television signal source such as video cassette recorders and video games. Thus, a local code inserter 62 is connected to the video cassette recorder 20, and a local code inserter 64 is connected to the video game 22. The local code inserter 62 includes a timing device 66, such as a timer or clock, and an encoding device 68, and the local code inserter 64 includes a timing device 70, such as a timer or clock, and an encoding device 72.

Although a variety of different local code inserters can be configured to match a corresponding variety of television signal sources, each of the local code inserters 44, 46, 48, 62, and 64, as will be subsequently disclosed in additional detail herein, functions in a way which is appropriate to the nature of the television signal that it receives as an input. For example, the local code inserters 44, 46, and 48 may be arranged to inject local codes into each of a plurality of channels since the television signals that they receive are multi-channel television signals. Accordingly, the local code inserters 44, 46, and 48 are able to sequentially encode each active channel of the multi-channel television signals which they receive. On the other hand, the local code inserters 62 and 64 may be arranged to inject local codes into a single channel since the television signals that they receive are single channel television signals. Accordingly, the local code inserters 62 and 64 are able to encode the single active channel of the television signals which they receive.

Furthermore, although a variety of local codes may be injected by each of the local code inserters 44, 46, 48, 62, and 64, each such local code preferably includes a unique local code inserter ID and a local code inserter time stamp. Each local code inserter ID uniquely identifies its corresponding local code inserter 44, 46, 48, 62, or 64, and the local code inserter time stamp in each local code indicates the current setting of a corresponding one of the timing devices 50, 54, 58, 66, and 70. This local code inserter time stamp may have a format corresponding to ordinary clock time, a format corresponding to the number of time intervals of arbitrary length that have passed since the corresponding timing device means was started or re-started, or any other convenient format.

In the system of the present invention, encoded television signals are carried from the local code inserters to the viewing sites 24, 26, and 28 by an interconnection network 74. This interconnection network 74 may comprise a number of video switches, splitters, and/or local cables, and may be arranged to route the encoded television signals from the local code inserter 44, from the local code inserter 46, from the local code inserter 48, from the local code inserter 62, and from the local code inserter 64 to the television receivers 36, 38, and 40 in any desired manner. Since each local code inserter of the present invention injects a unique local code inserter ID into its corresponding television signals, pre-knowledge of the connection configuration of the interconnection network 74 is not required in order for the present invention to identify the television signal input which supplies the television signals to which each of the television receivers is tuned. Accordingly, the present invention obviates the need to track television signals through the interconnection network 74 to the television receivers 36, 38, and 40.

More specifically, the system of the present invention, in which television signals are encoded at or near the service entrances of dwellings, provides advantages over conventional audience measurement systems. Conventional audience measurement systems require knowledge of the program line-ups of the programs supplied to the television signal inputs (e.g., the cable input 16) of the dwelling. Conventional audience measurement systems also require knowledge of the interconnection network which routes the television signals from the service entrances to the viewing sites of dwellings. From this knowledge, the conventional audience measurement systems is able to determine which television signal inputs are the source of the television program signals to which each television receiver is tuned. From the knowledge of the relationship between the television signal inputs and the television program signals to which the television receivers are tuned, and from knowledge of the program line-ups of the programs supplied to the television signal inputs, the conventional audience measurement systems are able to determine the identity of the programs being viewed.

However, program line-ups and interconnection networks may be changed from time to time. For example, the local cable operator may shift a program from Channel X to Channel Y, and the video cassette recorder 20 may be moved from one viewing site, such as the viewing site 24, to another, such as the viewing site 26. If such changes are made, the conventional audience measurement system is unable to determine the television signal input which receives the program being viewed. If the conventional audience measurement system is unable to determine the television signal input which receives the program being viewed, the conventional audience measurement system is unable to accurately use program line-ups in order to determine the identity of programs being viewed.

However, the present invention is independent of any specific interconnection network and of any specific program line-ups provided at the time of system installation because the system of the present invention is able to accurately determine the correct television signal input from the local codes injected by the local code inserters. This independence is a significant advantage over conventional audience measurement systems.

At the viewing site 24, a decoder 76 decodes the local code from the encoded television signal received by the television receiver 36 in order to thereby determine the local code inserter ID and the local code inserter time stamp which were injected into the encoded television signal received by the television receiver 36. At the viewing site 26, a decoder 78 decodes the local code from the encoded television signal received by the television receiver 38 in order to thereby determine the local code inserter ID and the local code inserter time stamp which were injected into the encoded television signal received by the television receiver 38. At the viewing site 28, a decoder 80 decodes the local code from the encoded television signal received by the television receiver 40 in order to thereby determine the local code inserter ID and the local code inserter time stamp which were injected into the encoded television signal received by the television receiver 40. The decoded local code inserter IDs identify the television signal inputs supplying the television signals to which the television receivers are tuned. The decoded local code inserter time stamps identify the times that the television signal inputs received the television signals to which the television receivers are tuned.

The decoder 76 adds a corresponding decoder time stamp to the decoded local code inserter ID and the decoded local code inserter time stamp which it decoded from the television signal received by the television receiver 36, and the decoder 76 supplies the corresponding decoder time stamp, the corresponding decoded local code inserter ID, and the corresponding decoded local code inserter time stamp to a local home unit computer 82. The decoder 78 adds a corresponding decoder time stamp to the decoded local code inserter ID and the decoded local code inserter time stamp which it decoded from the television signal received by the television receiver 38, and the decoder 78 supplies the corresponding decoder time stamp, the corresponding decoded local code inserter ID, and the corresponding decoded local code inserter time stamp to the local home unit computer 82. The decoder 80 adds a corresponding decoder time stamp to the local code inserter ID and the local code inserter time stamp which were injected into the television signal received by the television receiver 40, and the decoder 80 supplies the corresponding decoder time stamp, the corresponding local code inserter ID, and the corresponding local code inserter time stamp to the local home unit computer 82.

The local home unit computer 82 may be of conventional design. The decoder time stamps, the decoded local code inserter IDs, and the decoded local code inserter time stamps may be supplied by the decoders 76, 78, and 80 to the local home unit computer 82 by way of dedicated wiring or by way of a carrier current link on the household's main power wiring. However, any other manner of transmitting this data to the local home unit computer 82 may be employed.

In some cases, other types of audience measurements, such as the active or passive identification of viewers, may also be performed in connection with, or by, the in-home television tuning measurement system 10 at the viewing sites 24, 26, and 28. If so, the decoders 76, 78, and 80 may also supply other time stamped audience measurement data, such as time stamped data related to the identities of the viewers in the viewing sites 24, 26, and 28 of the metered, statistically selected dwelling 12, to the local home unit computer 82.

The local home unit computer 82 may include a memory and communication unit and may function as a local controller for the in-home television tuning measurement system 10. The local home unit computer 82 periodically forwards the data it collects from the decoders 76, 78, and 80 to a central office 84. For example, the local home unit computer 82 forwards this data once each day by way of a public switching telephone network 86.

The central office 84, as is known in the art, has a clock 88 that is regularly re-synchronized with a national time standard 90. In the U.S., for example, the clock 88 may be synchronized by the time signal which is broadcast by NIST over radio station WWVB. A clock 92 in the local home unit computer 82 may be, as is also known in the art, re-synchronized by use of the clock 88 in the central office 84 during each data collection telephone call between the central office 84 and the local home unit computer 82. Although it is known, as taught by Waechter et al in U.S. Pat. No. 4,943,963, to synchronize other portions of the in-home television tuning measurement system 10, such as the timing devices 50, 54, 58, 66, and 70 of the corresponding local code inserters 44, 46, 48, 62, and 64, and timing devices in the decoders 76, 78, and 78, to the clock 92 in the local home unit computer 82, it may be preferable to allow one or more of these other portions of the in-home television tuning measurement system 10 to run freely (i.e., without regular re-synchronization) and to use one of the clocks 88 and 92, which are regularly re-set, to track whatever temporal drift may occur in each such free running other portions.

Figure 2:
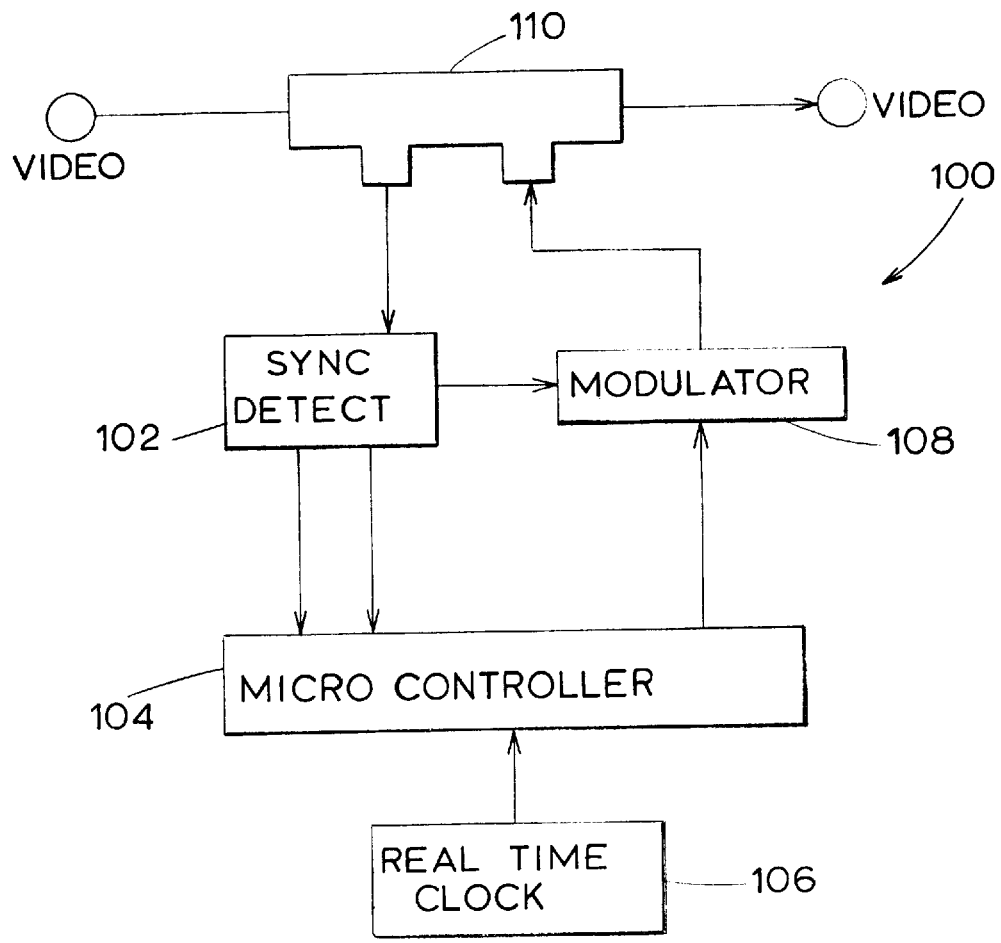
FIG. 2 is a schematic block diagram of a first embodiment of a simplex local code inserter which may be used in connection with the in-home television tuning measurement system shown in FIG. 1 and which injects an identifying code into baseband video.

The local code inserters 62 and 64 may be identical except that each of the local code inserters 62 and 64 should be arranged to inject a unique local code into its corresponding television program signal. An example of a local code inserter 100, which may be used for either or both of the local code inserters 62 and 64, is shown in FIG. 2. As shown in FIG. 2, the local code inserter 100 may conveniently be in the form of a baseband encoder. The local code inserter 100 is connected to a television signal source (e.g., either the video cassette recorder 20 or the video game 22) and receives a television program signal therefrom. The local code inserter 100 preferably includes a video sync detection circuit 102 which is used to determine when the corresponding television signal source is active. The video sync detection circuit 102 is also used to detect the vertical and/or horizontal sync pulses of its corresponding television program signal.

The video sync detection circuit 102 supplies outputs representative of the vertical and/or horizontal sync pulses to a microcontroller 104, which may be a Model 68HC11 made by Motorola Corporation. The microcontroller 104 controls the process of injecting a local code into the television program signal which it receives from the television program signal source connected to the local code inserter 100. The microcontroller 104 injects this local code whenever the microcontroller 104 receives the appropriate vertical and/or horizontal sync pulse from the video sync detection circuit 102 indicating that the monitored television program signal from the corresponding television program signal source is present.

The microcontroller 104 generates the local code which includes, for example, (i) a local code inserter time stamp based upon the output from a timing device 106, and (ii) a local code inserter ID identifying the local code inserter 100. The timing device 106, such as the timing device 66 or the timing device 70, may be a real time clock, and the unique local code inserter ID identifying the local code inserter 100 may be stored in the memory, such as a ROM, of the microcontroller 104. In order to inject this local code into the television program signal from its corresponding television program signal source, such as the video cassette recorder 20 or the video game 22, the microcontroller 104 controls a modulator 108. The modulator 108 modulates the local code onto the television program signal through a suitable coupler 110. The coupler 110 connects the local code inserter 100 between its television program signal source and the interconnection network 74.

In order to ensure that the local code which is injected into the television signal by the local code inserter 100 does not interfere either with the viewing portion of the television program signal or with a network identification code that may be present in the television baseband signal, the microcontroller 104 uses the vertical and/or horizontal sync pulses from the video sync detection circuit 102 to select an appropriate interval of the television program signal during which the local code is injected. For example, the local code inserter 100 may inject the local code into the television program signal at the normally empty fourth and fifth lines of the NTSC standard video waveform of the television program signal. Code injected in this portion of the television program signal will not interfere with any other ancillary codes which are present in the same television program signal. For example, such other ancillary codes may include an AMOL network-identifying code which is typically carried on the twentieth line of the NTSC standard video waveform, or a closed-captioning code carried on the twenty first line of the NTSC standard video waveform.

Figure 3:
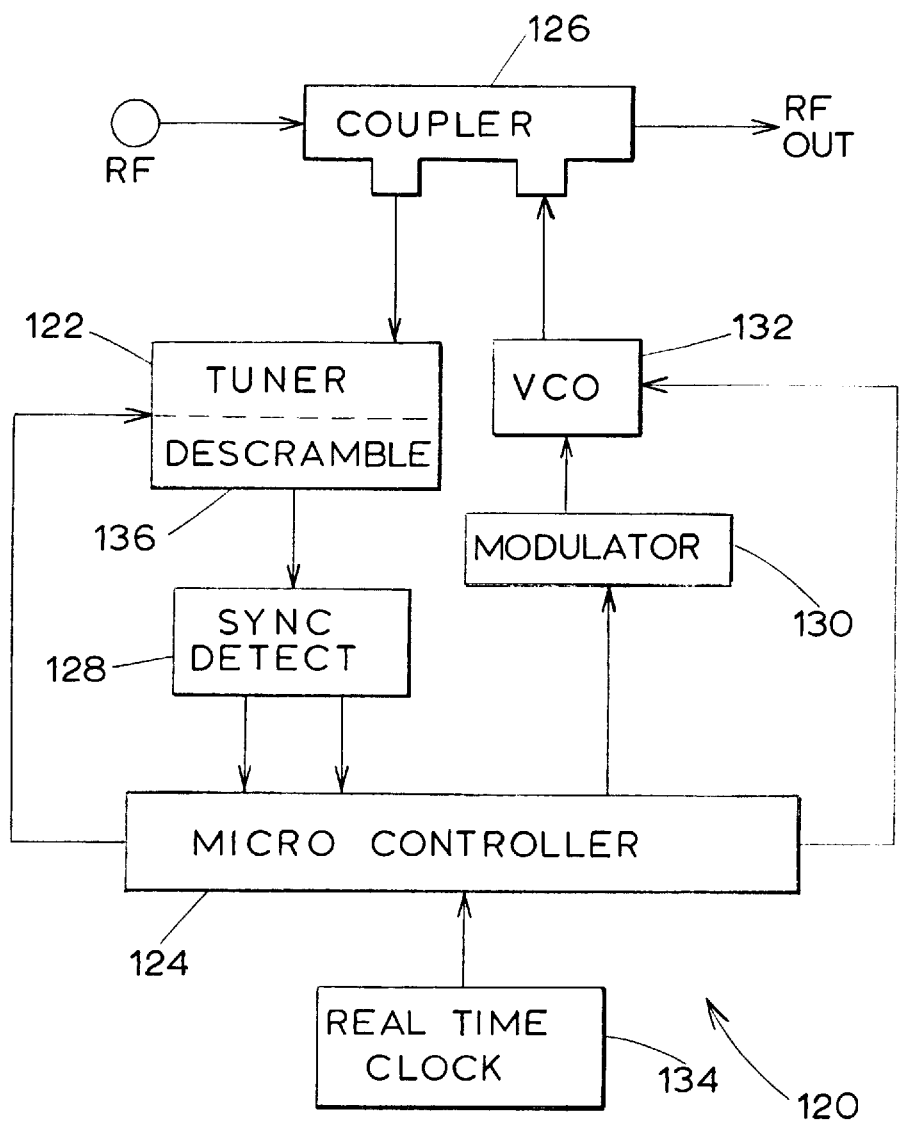
FIG. 3 is a schematic block diagram of a radio frequency local code inserter which may be used in connection with the in-home television tuning measurement system shown in FIG. 1 and which injects an identifying code into an RF signal.

The local code inserters 44, 46, and 48 may be identical except that each of the local code inserters 44, 46, and 48 should be arranged to inject a unique local code into its corresponding television program signal. An example of a local code inserter 120, which may be used for any or all of the local code inserters 44, 46, and 48, is shown in FIG. 3. As shown in FIG. 3, the local code inserter 120, which may conveniently be in the form of a radio frequency encoder, preferably includes a tuner 122. The tuner 122 is controlled by a microcontroller 124 to sequentially select the tunable channels which are active, which are available in the television program signal from a corresponding television program signal source, such as the antenna input 14, the cable input 16, or the satellite receiver input 18, and which are connected to the local code inserter 120 by way of a coupler 126. A video sync detection circuit 128 detects the vertical and/or horizontal sync pulses of the television program signal carried by the channel to which the tuner 122 is tuned at any instant of time. The video sync detection circuit 128 supplies outputs representative of these vertical and/or horizontal sync pulses to the microcontroller 124. As in the case of the microcontroller 104 of the local code inserter 100, the microcontroller 124 controls the process of injecting a local code into the television program signal carried by the channel selected by the tuner 122 in synchronization with the vertical and/or horizontal sync pulses from the video sync detection circuit 128.

In order to inject this local code into the television program signal from its corresponding television program signal source, the microcontroller 104 controls a modulator 130. The modulator 130 amplitude modulates the local code and supplies the modulated local code to a voltage controlled oscillator 132. The voltage controlled oscillator 132 is controlled by the microcontroller 124 in order to supply the local code at the same RF channel frequency as the RF channel frequency selected by the tuner 122. By use of the vertical and/or horizontal sync pulses from the video sync detection circuit 128, the local code is injected into the appropriate portion of the television program signal received by the coupler 126 so that the local code does not interfere with the active video or with another ancillary code present in this television program signal. The encoded television program signal from the voltage controlled oscillator 132 is supplied through the coupler 126 to the interconnection network 74. The coupler 126 connects the local code inserter 120 between its television program signal source and the interconnection network 74.

If desired, the injection level may be changed with a variable attenuator controlled in software. A software set-up routine is periodically run in order to set up and update the injection level. When the routine is started, injection is done first at the lowest level, the tuner 122 is tuned to the same channel where the signal is injected, and the detector is tested in order to determine if the injected signal is receivable. If not, the level of injection is increased until the injection signal is detected. The value of injection for each channel is thus determined and stored in nonvolatile memory, and is used any time there is injection on the corresponding channel.

The local code inserter 120 is expected to be used, in the great majority of cases, in connection with television program signal sources offering a plurality of tunable channels. The local code, which is injected into the television program signal by the local code inserter 120, therefore, preferably includes a designation of the channel, or the channel frequency of the channel, into which the local code is injected. This local code also preferably includes the unique local code inserter ID of the local code inserter 120 and the local code inserter time stamp. The local code inserter time stamp is based upon a clock 134. This local code is injected in sequence into each channel of the television program signal which is available from the television program signal source corresponding to the local code inserter 120.

The efficiency of the local code inserter 120 may be enhanced by arranging the microcontroller 124 to evaluate the output from the video sync detection circuit 128 in order to determine when the channels selectable by the tuner 122 have video content, i.e., when the channels selectable by the tuner 122 carry programs. As a result of this evaluation, a list of currently active channels may be assembled and stored in the random access memory of the microcontroller 124. The tuner 122 may be controlled in accordance with this list to select only those channels known to be active. The microcontroller 124 may be arranged to thereafter control the tuner 122 in order to periodically scan all of the possible channels in order to update the currently active channel list which is stored in the random access memory of the microcontroller 124.

One or more of the television program signals received in the metered, statistically selected dwelling 12 may be scrambled by scrambling devices that suppress the synchronization portions of the television program signals. If so, a descrambler 136 may be used with the tuner 122 in the local code inserter 120 in order to regenerate the synchronization information which is to be detected by the video sync detection circuit 128 so that the locally code can be injected into only the appropriate portions of the television program signals.

Thus, in the in-home television tuning measurement system 10, a local code inserter, such as the local code inserter 120, is provided for each of the multi-channel television program signal inputs, such as the antenna input 14, the cable input 16, and the satellite receiver input 18. Each such local code inserter 120 independently scans its corresponding television program signal to inject a local code into each active channel of each of the television program signals. If over-the-air broadcast signals are received by way of a local antenna, such as a set of rabbit ears, which is connected directly to a television receiver, such as any of the television receivers 36, 38, and 40 located in the corresponding viewing sites 24, 26, and 28, the in-home television tuning measurement system 10 may also include additional local code inserters, such as the local code inserter 120, located at or near the television receivers having such local antennae.

Figure 4:
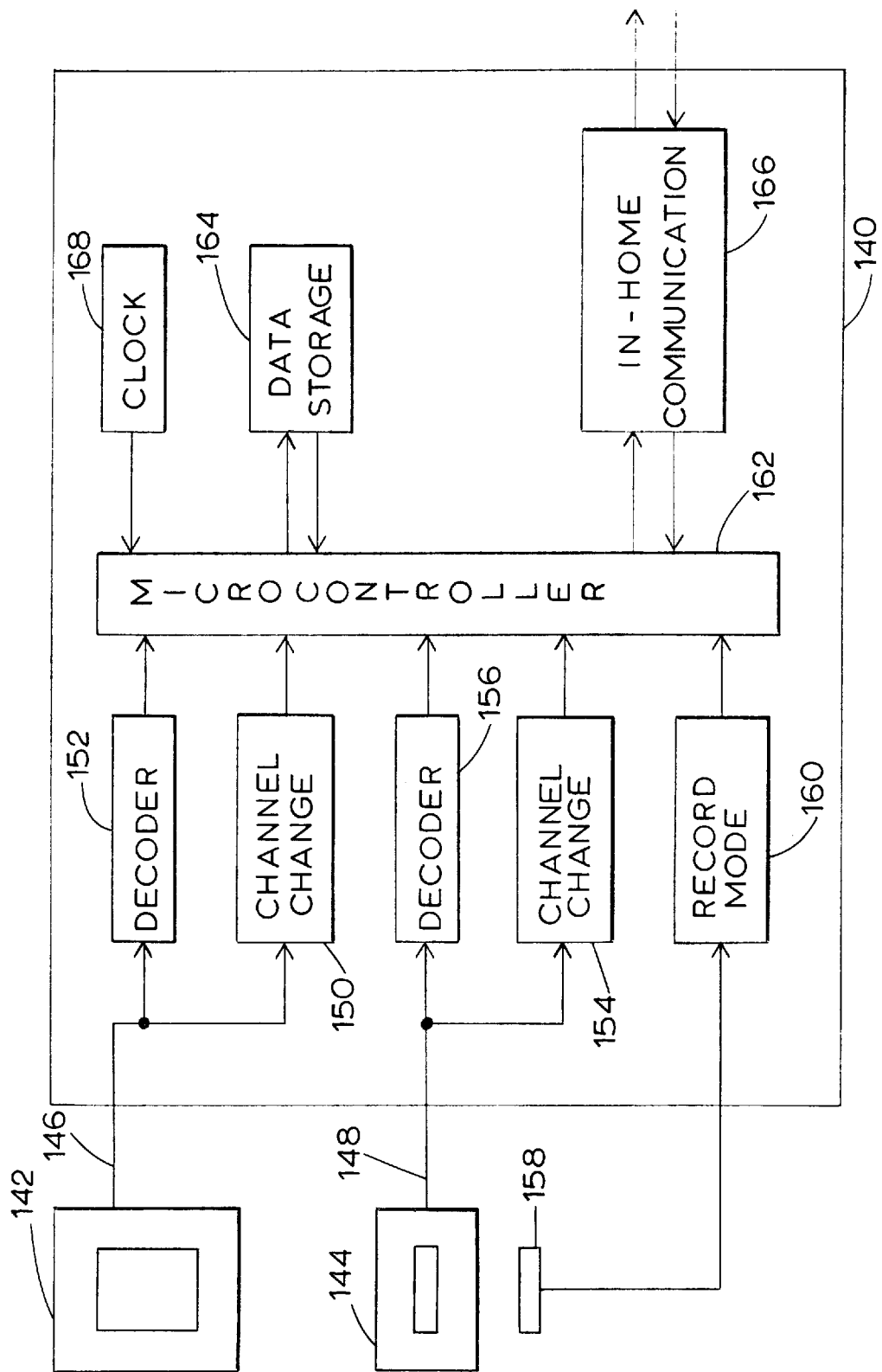
FIG. 4 is a schematic block diagram of a decoder which may be used in connection with the in-home television tuning measurement system shown in FIG. 1.

Shown in FIG. 4 is a decoder 140 which may be used for any or all of the decoders 76, 78, and 80. The decoder 140 is connected to a television receiver 142, such as any of the television receivers 36, 38, or 40, and to a video cassette recorder 144, such as the video cassette recorder 20. It should be understood, however, that a wide variety of other home entertainment equipment could be present at the viewing site serviced by the decoder 140.

The decoder 140 has parallel inputs 146 and 148 connected to corresponding suitable outputs of the television receiver 142 and the video cassette recorder 144. Thus, the decoder 140 is capable of monitoring the television receiver 142 and the video cassette recorder 144 in parallel so as to provide a short resolution time for its tuning measurements. It should be understood, however, that the inputs 146 and 148 could be analyzed sequentially; but, if the inputs 146 and 148 are analyzed sequentially, the resolution time of the decoder 140 is longer.

The input 146 is connected to a channel change detector 150 which employs known means to examine the stability of the television program signal timing in order to detect channel changes with respect to the television receiver 142. The input 146 is also connected to a decoder 152 which preferably has the capability to read the codes locally inserted by the local code inserters 100 and 120 and to read whatever additional ancillary source identification codes which may been added to the television program signals upstream of the metered, statistically selected dwelling 12 and which may be present on the input 146.

Similarly, the input 148 is connected to a channel change detector 154 which also employs known means to examine the stability of the television program signal timing in order to detect channel changes with respect to the video cassette recorder 144. The input 148 is also connected to a decoder 156 which preferably has the capability to read the codes locally inserted by the local code inserters 100 and 120 and to read whatever additional ancillary source identification codes which may been added to the television program signals upstream of the metered, statistically selected dwelling 12 and which may be present on the input 148. The channel change detectors 150 and 154 are provided so that channel change measurements may have greater resolution regardless of the frequency of code insertion.

It is known to track time-shifted viewing of in-home recorded television programs by monitoring the recording activity of a video cassette recorder and by subsequently measuring the viewing of such previously monitored and recorded television programs. In the system of the present invention, this monitoring activity is preferably accomplished by monitoring the television program signals to which the video cassette recorder 144 is tuned and by determining when the video cassette recorder 144 is in record-mode. For example, as has been taught by Vitt in U.S. Pat. No. 5,165,069, a non-invasive inductive pickup 158, which is tuned to the characteristic frequency of the erase head of the video cassette recorder 144 (normally about sixty kilohertz), may be used to determine when the video cassette recorder 144 is in record-mode. The non-invasive inductive pickup 158 is connected to a record-mode detection circuit 160 which is responsive to the signal from the non-invasive inductive pickup 158 in order to determine when the video cassette recorder 144 is in record-mode.

When the output from the record-mode detection circuit 160 indicates to a microcontroller 162 that the video cassette recorder 144 is recording, the local code inserter IDs, the local code inserter time stamps, and any ancillary source identification codes from the video cassette recorder 144 as decoded by the decoder 156 are read by the microcontroller 162 and are temporarily stored in a local memory 164. The decoder 140 includes a clock 168 to permit the microcontroller 162 to add corresponding decoder time stamps to the local code inserter IDs, the local code inserter time stamps, and the ancillary source identification codes, if any, decoded from the inputs 146 and 148 and to store the corresponding decoder time stamps, local code inserter IDs, ancillary source identification codes, and local code inserter time stamps together in the local memory 164. Periodically, the decoder time stamps, the local code inserter IDs, the local code inserter time stamps, and any ancillary source identification codes stored in the local memory 164 are communicated to the local home unit computer 82 by way of an appropriate communication interface 166. The time-stamped records from the input 148 are subsequently employed by the local home unit computer 82 to identify the previously recorded television programs when these programs are played back.

Figure 5:
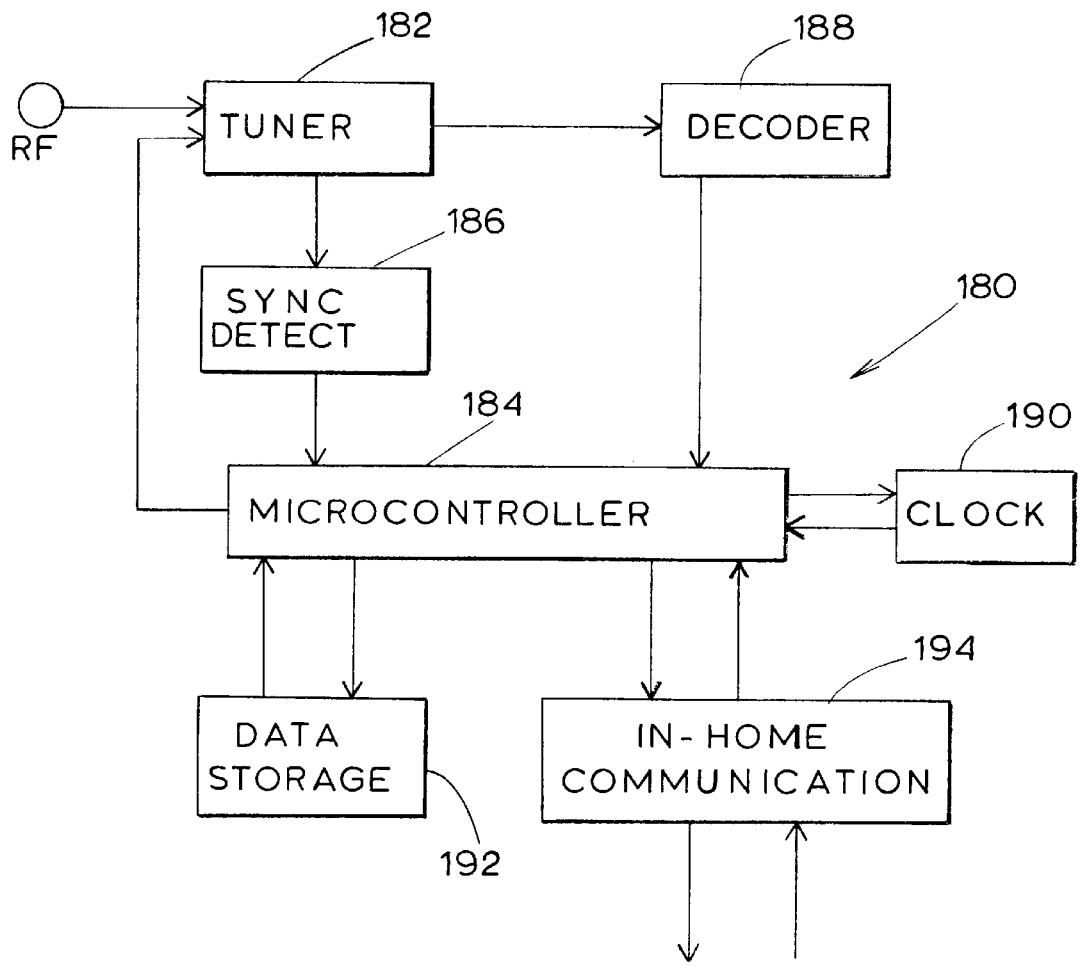
FIG. 5 is a schematic block diagram showing the elements of a source identification code processor which identifies sources of program signals and which may be installed in combination with the in-home television tuning measurement system shown in FIG. 1; and, FIG. 6 of the drawing is a flow chart representing a program which may be executed by the in-home television tuning measurement system shown in FIG. 1 and which shows the steps of an automatic line-up updating process.

In situations where ancillary source identification codes, such as program originator identification codes, network identification codes, local station identification codes, cable network identification codes, cable system identification codes, satellite system identification codes, video server identification codes, and/or the like identification codes, are in general use, a source identification code processor 180, which is shown in FIG. 5, may be used in addition to the decoder 140. A local code inserter, such as the local code inserters 44, 46, 48, 62, and 64, as discussed previously, is preferably installed between a corresponding service entrance and the interconnection network 74, and the source identification code processor 180 is preferably installed at a point that is both downstream of a corresponding local code inserter and upstream of any point where some channels may be split off from the remaining channels in the corresponding television program signal. In some cases, the source identification code processor 180 may be installed, and may share common components, with one of the decoders 76, 78, and 80, since the decoding function of the decoders 76, 78, and 80 can be performed even when the television receivers 36, 38, and 40 associated with the decoders 76, 78, and 80 are turned off.

The source identification code processor 180 includes a tuner 182 which, under control of a microcontroller 184, scans all the channels in a multi-channel television program signal at an RF input of the source identification code processor 180. A complete scan is made when the source identification code processor 180 is initially installed and at selected intervals thereafter. The tuner 182 supplies each tuned television program signal to a video sync detection circuit 186 and to a decoder 188. The video sync detection circuit 186 senses the vertical and/or horizontal sync pulses in the channels scanned by the tuner 182, and the decoder 188 reads a source identification code, if present, in the channels scanned by the tuner 182. For example, this source identification code may be a station ID, a program ID, a network ID, and/or the like.

Accordingly, the microcontroller 184 of the source identification code processor 180 controls the tuner 182 to tune to each possible channel in the television program signal supplied as an input to the tuner 182. As the tuner selects a channel under control of the microcontroller 184, the microcontroller 184 tests the output of the video sync detection circuit 186 to determine if the selected channel is active, i.e. whether the channel carries vertical and/or sync pulses. If the microcontroller 184 detects from the output of the video sync detection circuit 186 that the selected channel is active, the microcontroller 184, in response to the vertical and horizontal sync pulses detected by the video sync detection circuit 186, reads the source identification code, if any, which is decoded by the decoder 188 from predetermined lines of the television program signal. The source identification code processor 180 includes a clock 190 to permit the microcontroller 184 to add corresponding source identification time stamps to the source identification code read by the microcontroller 184.

If the microcontroller 184 detects that the selected channel is active, and if the microcontroller 184 is able to read the source identification code for that channel, the microcontroller 184 stores the channel number of the selected channel, the source identification code carried on the selected channel, and a source identification time stamp indicating the time that the source identification code was read, in a memory 192. The channel number of the selected channel, the source identification code carried on the selected channel, and the source identification time stamp are stored in the memory 192 until the channel number of the selected channel, the source identification code carried on the decoded selected channel, and the source identification time stamp are communicated to the local home unit computer 82 by way of an appropriate communication interface 194.

The source identification code processor 180 may compile a line-up table which lists each source identification code and the channel on which it was last found. A periodic repetition of this process updates the line-up table for a given metered, statistically selected dwelling 12 so that this line-up table is current, and so that no line-up changes will result in errors in an audience measurement.

The channel and/or program viewing metering data provided by the present system may be derived on a minute-by-minute basis because the present system relies on local code inserters such as the local code inserters 44, 46, 48, 62, and 64. The local code inserters 44, 46, 48, 62, and 64 are able to inject robust local code inserter IDs having low data rates into their corresponding television program signals. These robust local code inserter IDs are easily decoded.

On the other hand, as noted in the description of the AMOL system above, many existing network codes (e.g., the AMOL codes used by commercial networks in the U.S. and the teletext source-identifying codes embedded in broadcast teletext by some European broadcasters) may be more difficult to decode reliably. Thus, the source identification code processor 180, which reads the source identification codes inserted into television program signals by encoders which are located remotely from the metered, statistically selected dwelling 12 may require several attempts in order to successfully read source identification codes. Accordingly, the monitoring provided by the source identification code processor 180 may be on a day-by-day basis rather than on a minute-by-minute basis. However, a day-by-day basis is adequate for compiling and updating a line-up table.

Figure 6:
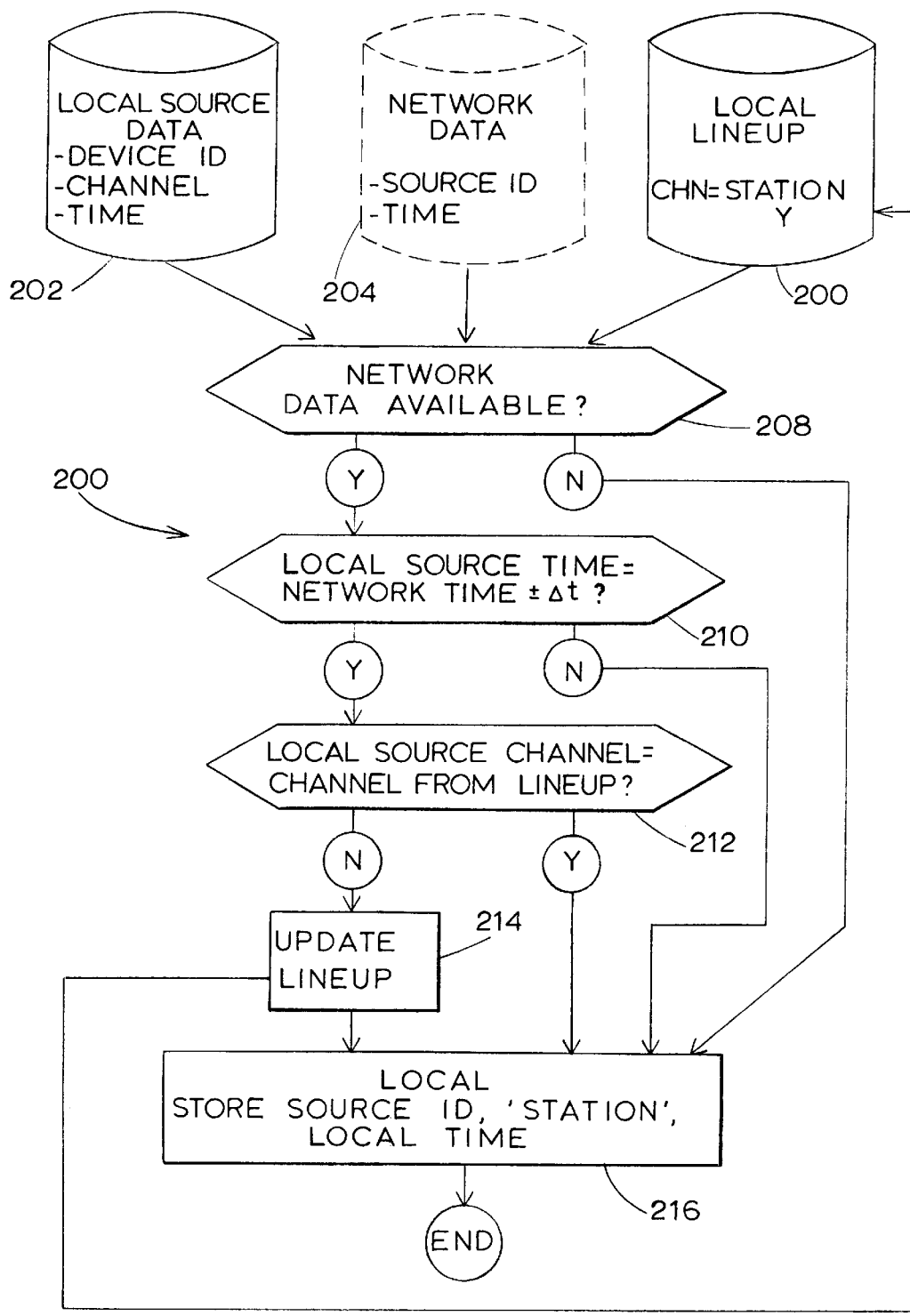

Shown in FIG. 6 is a flow chart 200 which represents a program that can be executed by the microcontroller 184 of the source identification processor 180. Alternatively, the source identification processor 180 may be used simply to read source identification codes, to detect the channels on which the corresponding source identification codes are carried, and to provide the appropriate time stamps. In this case the program represented by the flow chart 200 may be executed by either an apparatus in the metered, statistically selected dwelling 12, such as by the local home unit computer 82, or by a computer in the central office 84. Inputs to the program represented by the flow chart 200 include a local source data file 202, a source identification file 204, and a line-up file 206. The records of the local source data file 202 preferably contain the local code inserter IDs, corresponding channel numbers, and corresponding local code inserter time stamps which were decoded by the decoders 76, 78, and/or 80 and which are saved in a memory, such as a memory of the local home unit computer 82 or in a memory at the central office 84. Records of the source identification file 204 preferably contain the corresponding source identification codes and source identification time stamps decoded by the source identification code processor 180 and which are saved in a memory such as in a memory, of the local home unit computer 82 or in a memory at the central office 84. Records of the line-up file 206 preferably contain a line-up table which was compiled and is updated by the program represented by the flow chart 200. This line-up table includes record pairs. Each record pair includes a source identification code and the channel number of the last channel which carried the program identified by the source identification code.

Each time that the program represented by the flow chart 200 is entered, a block 208 of the program represented by the flow chart 200 determines from the records of the source identification file 204 if source identification codes and corresponding source identification time stamps are available. If so, a block 210 compares a source identification time stamp corresponding to one of the source identification codes stored in the source identification file 204 to the local code inserter time stamps stored in the local source data file 202 in order to determine if there is a match. A match between the source identification time stamp corresponding to one of the source identification codes and one of the local code inserter time stamps indicates that this source identification code was acquired from a received program as opposed to a play back of a previously recorded program.

If there is a time stamp match, a block 212 finds, from the source identification file 204, the source identification code corresponding to the source identification time stamp which matched the local code inserter time stamp as determined by the block 210. The block 212 also finds, from the local source data file 202, the channel number which corresponds to the local code inserter time stamp which matched the source identification time stamp as determined by the block 210. The block 212 then determines if this channel number which it found from the local source data file 202 is the same as the channel number which is stored in the line-up file 201 and which is paired with the same source identification code that it found from the source identification file 204. If these channel numbers do not agree, a block 214 updates the line-up file 206 by replacing in the line-up file 206 the channel number which is paired with the same source identification code that it found from the source identification file 204 with the channel number that it found from the local source data file 202. A block 216 then stores in a memory the local source identification, the source identification code, and a local time stamp.

If source identification codes and corresponding source identification time stamps are not available as determined by the block 208, or if a source identification time stamp corresponding to one of the source identification codes stored in the source identification file 204 does not match any of the local code inserter time stamps stored in the local source data file 202 as determined by the block 210, or if the channel number which is paired with the same source identification code that the block 212 found from the source identification file 204 matches the channel number that the block 212 found from the local source data file 202, the block 216 stores in a memory the local source identification, the source identification code, and a local time stamp.

Although, as de scribed above, the foregoing process of compiling and updating the line-up file 206 may be carried out entirely in the metered, statistically selected dwelling 12, the central office 84 may be advantageously used in this compiling and updating process. For example, the metered, statistically selected dwellings may include a first metered, statistically selected dwelling 12 in which the relatively high data-rate ancillary source identification codes are not legible, and a second metered, statistically selected dwelling 12 in which these relatively high data-rate ancillary source identification codes are legible. If both the first and second metered, statistically selected dwellings 12 are served by the same television program signal source, such as a cable system, then the central office 84 can apply line-up update data from the second metered, statistically selected dwelling 12 to tuning records measured in the first metered, statistically selected dwelling 12.

Thus, for example, if a cable-only channel is shifted by the cable system operator serving the first metered, statistically selected dwelling 12 from an existing channel into a previously unoccupied channel, the measurement data from the second metered, statistically selected dwelling 12 may be used to correct the line-up data in the central office 84 in order to avoid measurement errors which would otherwise result in connection with the tuning records from the first metered, statistically selected dwelling 12. Accordingly, by utilizing the central office 84 to apply line-up update data from one of the metered, statistically selected dwellings 12 to viewing measured in another of the metered, statistically selected dwellings 12, errors and data loss can thereby be minimized.

Although the present invention has been described with respect to several preferred embodiments, many modifications and alterations can be made without departing from the present invention. For example, although the present invention has been described in connection with the metering of television receivers, the present invention can also be used to meter radio receivers. Therefore, a viewing site, such as one or more of the viewing sites 24, 26, and 28, may be referred to more generally as an audience site, i.e. a site at which an audience enjoys a program by way of a television receiver, a radio receiver, or other type of receiver.

Moreover, although the decoders 76, 78, and 80 have been shown physically connected to their respective receivers, one or more of the decoders 76, 78, and 80 can be personal portable decoders for the remote metering of receivers. Thus, such personal portable decoders can be used, for example, to accommodate away-from-home metering.

Furthermore, although the decoders discussed above have been described as performing a decoding operation, this decoding operation may be as simple as reading a code which had been inserted into a signal. Also, the decoders discussed above may be coupled to their corresponding receivers by direct connections as shown, or they may be coupled to their corresponding receivers by electromagnetic transmissions, by audible or inaudible tones, by light transmissions, and/or the like.

Accordingly, it is intended that all such modifications and alterations be considered as within the spirit and scope of the invention as defined in the attached claims.

We claim:

1. An audience measurement system for metering tuning of a receiver which receives a plurality of program signals transmitted over a plurality of channels, wherein the receiver is located at an audience site within a dwelling, and wherein the plurality of program signals enter the dwelling at a service entrance and are supplied therefrom to the audience site, the audience measurement system comprising:

code inserting means for inserting a code in each of the program signals at a location which is intermediate the service entrance and the audience site, wherein the code includes a unique local code inserter ID and a code inserter time stamp;

decoding means for decoding the unique local code inserter ID and the code inserter time stamp at the audience site; and, collecting and storing means within the dwelling for collecting and storing the decoded unique local code inserter ID and code inserter time stamp and for communicating the decoded unique local code inserter ID and code inserter time stamp to a remote site.

2. The audience measurement system of claim 1 wherein the code inserted by the code inserting means further includes a channel number indicative of the channel corresponding to each of the program signals in which the code is inserted.

3. The audience measurement system of claim 1 wherein the code inserting means further comprises active channel determining means for determining those channels which are active, and wherein the code inserting means is arranged to insert the code on each of the active channels.

4. The audience measurement system of claim 1 wherein the code inserting means comprises first code inserting means, and wherein the audience system further comprises:

a signal source within the dwelling; and, second code inserting means for inserting a code in a signal from the signal source within the dwelling at a location which is intermediate the signal source within the dwelling and a receiver which receives the signal from the signal source within the dwelling, wherein the code inserted by the second code inserting means includes a unique local code inserter ID and a code inserter time stamp.

5. The audience measurement system of claim 1 further comprising a clock in the dwelling which is synchronized by a clock at the remote site.

6. An audience measurement system for metering tuning of receiving means, wherein the receiving means receives a first plurality of program signals transmitted over a plurality of channels and a second plurality of program signals transmitted over a plurality of channels, wherein the receiver means is located at an audience site within a dwelling, wherein the first plurality of program signals enters the dwelling through a first service entrance and is supplied therefrom to the audience site, and wherein the second plurality of program signals enters the dwelling through a second service entrance and is supplied therefrom to the audience site, the audience measurement system comprising:

first code inserting means for inserting a code in each of the first plurality of program signals at a location which is intermediate the first service entrance and the audience site, wherein the code inserted by the first code inserting means includes a corresponding unique local code inserter ID and a corresponding code inserter time stamp;

second code inserting means for inserting a code in each of the second plurality of program signals at a location which is intermediate the second service entrance and the audience site, wherein the code inserted by the second code inserting means includes a corresponding local unique code inserter ID and a corresponding code inserter time stamp;

decoding means at the audience site for decoding the unique code inserter IDs and the code inserter time stamps corresponding to the codes inserted by the first and second code inserting means; and, collecting and storing means within the dwelling for collecting and storing the decoded unique code inserter IDs and code inserter time stamps corresponding to the codes inserted by the first and second code inserting means and for communicating the decoded unique code inserter IDs and code inserter time stamps corresponding to the codes inserted by the first and second code inserting means to a remote site.

7. The audience measurement system of claim 6 wherein the code inserted by the first code inserting means further includes a channel number uniquely indicative of a channel carrying a program signal containing the code inserted by the first code inserting means, and wherein the code inserted by the second code inserting means further includes a channel number uniquely indicative of a channel carrying a program signal containing the code inserted by the second code inserting means.

8. The audience measurement system of claim 6 wherein the first code inserting means further comprises first active channel determining means for determining those channels which are active, wherein the first code inserting means is arranged to insert a code on each of the active channels determined by the first active channel determining means, wherein the second code inserting means further comprises second active channel determining means for determining those channels which are active, and wherein the second code inserting means is arranged to insert a code on each of the active channels determined by the second active channel determining means.

9. The audience measurement system of claim 6 further comprising:

a signal source within the dwelling; and, third code inserting means for inserting a code in a signal from the signal source within the dwelling at a location which is intermediate the signal source within the dwelling and a receiver which receives the signal from the signal source within the dwelling, wherein the code inserted by the third code inserting means includes a corresponding unique local code inserter ID and a corresponding code inserter time stamp.

10. The audience measurement system of claim 6 further comprising a clock in the dwelling which is synchronized by a clock at the remote site.

11. The audience measurement system of claim 6 wherein the audience site comprises first and second audience sites, wherein the receiving means comprises a first receiving means located at the first audience site, wherein the receiving means comprises a second receiving means located at the second audience site, wherein the first receiving means receives the first plurality of program signals transmitted over a plurality of channels, and wherein the second receiving means receives the second plurality of program signals transmitted over a plurality of channels.

12. The audience measurement system of claim 11 wherein the decoding means comprises:

first decoding means for decoding the unique local code inserter ID and the code inserter time stamp corresponding to the code inserted by the first code inserting means, wherein the first decoding means is located at the first audience site; and, second decoding means for decoding the unique local code inserter ID and the code inserter time stamp corresponding to the code inserted by the second code inserting means, wherein the second decoding means is located at the second audience site.

13. The audience measurement system of claim 12 wherein the first decoding means is coupled to the first receiving means, and wherein the second decoding means is coupled to the second receiving means.

14. The audience measurement system of claim 12 wherein the first decoding means is connected to the first receiving means, and wherein the second decoding means is connected to the second receiving means.

15. The audience measurement system of claim 12 wherein the first code inserting means further comprises first active channel determining means for determining those channels which are active, wherein the first code inserting means is arranged to insert a code on each of the active channels determined by the first active channel determining means, wherein the second code inserting means further comprises second active channel determining means for determining those channels which are active, and wherein the second code inserting means is arranged to insert a code on each of the active channels determined by the second active channel determining means.

16. The audience measurement system of claim 12 further comprises:

a signal source within the dwelling; and, third code inserting means for inserting a code in a signal from the signal source within the dwelling at a location which is intermediate the signal source within the dwelling and a receiver which receives the signal from the signal source within the dwelling, wherein the code inserted by the third code inserting means includes a corresponding unique local code inserter ID and a corresponding code inserter time stamp.

17. The audience measurement system of claim 12 further comprising a clock in the dwelling which is synchronized by a clock at the remote site.

18. The audience measurement system of claim 6 wherein the audience site comprises first and second audience sites, wherein the receiving means comprises a first receiving means located at the first audience site, wherein the receiving means comprises a second receiving means located at the second audience site, and wherein the first receiving means receives the first and/or second pluralities of program signals.

19. The audience measurement system of claim 18 wherein the decoding means comprises:

first decoding means for decoding the unique local code inserter ID and the code inserter time stamps corresponding to the codes inserted by the first and second code inserting means, wherein the first decoding means is located at the first audience site; and, second decoding means for decoding the unique local code inserter ID and the code inserter time stamp corresponding to the code inserted by the first and second code inserting means, wherein the second decoding means is located at the second audience site.

20. An audience measurement system for metering tuning of first and second receivers, wherein the first receiver receives a first plurality of program signals transmitted over a plurality of channels, wherein the second receiver received a second plurality of program signals transmitted over a plurality of channels, wherein the first receiver is located at a first audience site within a dwelling, wherein the second receiver is located at a second audience site within the dwelling, and wherein the first and second pluralities of program signals enter the dwelling through a service entrance and are supplied therefrom to the first and second audience sites, the audience measurement system comprising:

code inserting means for inserting a code in each program signal of the first and second pluralities of program signals at a location which is intermediate the service entrance and the first and second audience sites, wherein the code inserted by the code inserting means includes a corresponding unique local code inserter ID and a corresponding code inserter time stamp;

decoding means at the first and second audience sites for decoding the unique code inserter IDs and the code inserter time stamps corresponding to the codes inserted by the code inserting means; and, collecting and storing means within the dwelling for collecting and storing the decoded unique code inserter IDs and code inserter time stamps corresponding to the codes inserted by the code inserting means and for communicating the decoded unique code inserter IDs and code inserter time stamps corresponding to the codes inserted by the code inserting means to a remote site.

21. The audience measurement system of claim 20 wherein the code inserted by the code inserting means further includes a channel number uniquely indicative of a channel carrying a program signal containing the code inserted by the code inserting means.

22. The audience measurement system of claim 20 wherein the code inserting means further comprises active channel determining means for determining those channels which are active, and wherein the code inserting means is arranged to insert a code on each of the active channels determined by the active channel determining means.

23. The audience measurement system of claim 20 further comprising:

a signal source within the dwelling; and, signal source code inserting means for inserting a code in a signal from the signal source within the dwelling at a location which is intermediate the signal source within the dwelling and a receiver which receives the signal from the signal source within the dwelling, wherein the code inserted by the signal source code inserting means includes a corresponding unique local code inserter ID and a corresponding code inserter time stamp.

24. The audience measurement system of claim 20 further comprising a clock in the dwelling which is synchronized by a clock at the remote site.

25. The audience measurement system of claim 20 wherein the decoding means comprises:

first decoding means for decoding the unique local code inserter IDs and the code inserter time stamps, wherein the first decoding means is located at the first audience site; and, second decoding means for decoding the unique local code inserter IDs and the code inserter time stamps, wherein the second decoding means is located at the second audience site.

26. The audience measurement system of claim 25 wherein the code inserting means further comprises active channel determining means for determining those channels which are active, and wherein the code inserting means is arranged to insert a code on each of the active channels determined by the active channel determining means.

27. The audience measurement system of claim 25 further comprises:

a signal source within the dwelling; and, signal source code inserting means for inserting a code in a signal from the signal source within the dwelling at a location which is intermediate the signal source within the dwelling and a receiver which receives the signal from the signal source within the dwelling, wherein the code inserted by the signal source code inserting means includes a corresponding unique local code inserter ID and a corresponding code inserter time stamp.

28. An audience measurement system for metering tuning of a receiver, wherein the receiver receives a plurality of program signals which are transmitted over a plurality of channels and which are encoded with source identification codes, wherein the receiver is located at an audience site within a dwelling, and wherein the plurality of program signals enter the dwelling at a service entrance and are supplied therefrom to the audience site, the audience measurement system comprising:

storing means for storing a line-up list, wherein the line-up list links source identification codes with corresponding channel data;

tuning means for tuning a predetermined channel;

decoding means for decoding a source identification code from a signal on the predetermined channel;

comparing means for comparing a first channel datum from the line-up list with a second channel datum denoting the predetermined channel and for replacing the first channel datum with the second channel datum if the first and second channel data differ, wherein the first channel datum denotes a channel corresponding to the source identification code.

29. The audience measurement system of claim 28 wherein the comparing means is located within the dwelling.

30. The audience measurement system of claim 28 wherein the source identification codes contained in the line-up list are transmitted in signals at a first time, wherein the tuning means tunes the predetermined channel at a second time which is subsequent to the first time, and wherein the decoding means decodes the decoded source identification code from a signal on the predetermined channel at the second time.

31. The audience measurement system of claim 30 wherein the comparing means compares the first channel datum from the line-up list with the second channel datum denoting the predetermined channel and replaces the first channel datum with the second channel datum if the first and second channel data differ and if the source identification code linked to the first channel datum matches the source identification code decoded from the signal on the predetermined channel.

32. The audience measurement system of claim 28 wherein the comparing means compares the first channel datum from the line-up list with the second channel datum denoting the predetermined channel and replaces the first channel datum with the second channel datum if the first and second channel data differ and if the source identification code linked to the first channel datum matches the source identification code decoded from the signal on the predetermined channel.

33. The audience measurement system of claim 28 further comprising code inserting means for inserting a local code in each of the plurality of program signals at a location which is intermediate the service entrance and the audience site, wherein the local code includes a unique local code inserter ID and a code inserter time stamp, and wherein the decoding means decodes the unique local code inserter ID and the code inserter time stamp.

34. The audience measurement system of claim 33 wherein the local code inserted by the code inserting means further includes a channel number indicative of the channel corresponding to each of the program signals to which the local code is inserted.

35. The audience measurement system of claim 33 wherein the code inserting means further comprises active channel determining means for determining those channels which are active, and wherein the code inserting means is arranged to insert the local code on each of the active channels.

36. The audience measurement system of claim 33 wherein the code inserting means comprises first code inserting means, and wherein the audience system further comprises:
   a signal source within the dwelling; and,
   second code inserting means for inserting a local code in a signal from the signal source within the dwelling at a location which is intermediate the signal source within the dwelling and a receiver which receives the signal from the signal source within the dwelling, wherein the local code inserted by the second code inserting means includes a unique local code inserter ID and a code inserter time stamp.

37. The audience measurement system of claim 33 wherein the comparing means is located within the dwelling.

38. The audience measurement system of claim 33 wherein the source identification codes contained in the line-up list are transmitted in signals at a first time, wherein the tuning means tunes the predetermined channel at a second time which is subsequent to the first time, and wherein the decoding means decodes the decoded source identification code from a signal on the predetermined channel at the second time.

39. The audience measurement system of claim 38 wherein the comparing means compares the first channel datum from the line-up list with the second channel datum denoting the predetermined channel and replaces the first channel datum with the second channel datum if the first and second channel data differ and if the source identification code linked to the first channel datum matches the source identification code decoded from the signal on the predetermined channel.

40. The audience measurement system of claim 33 wherein the comparing means compares the first channel datum from the line-up list with the second channel datum denoting the predetermined channel and replaces the first channel datum with the second channel datum if the first and second channel data differ and if the source identification code linked to the first channel datum matches the source identification code decoded from the signal on the predetermined channel.

41. An audience measurement system for metering tuning of first and second receivers, wherein the first and second receivers receive a plurality of program signals which are transmitted over a plurality of channels and which are encoded with source identification codes, wherein the first and second receivers are located at corresponding first and second audience sites within corresponding first and second dwellings, and wherein the plurality of program signals enter the first and second dwellings at service entrances and are supplied therefrom to the first and second audience sites, the audience measurement system comprising:
   storing means for storing a line-up list, wherein the line-up list links source identification codes with corresponding channel data;
   first tuning means for tuning a predetermined channel, wherein the first tuning means is located within the first dwelling;
   first decoding means for decoding a source identification code from a signal on the predetermined channel tuned by the first tuning means, wherein the first decoding means is located within the first dwelling;
   second tuning means for tuning a predetermined channel, wherein the second tuning means is located within the second dwelling;
   second decoding means for decoding a source identification code from a signal on the predetermined channel tuned by the second tuning means, wherein the second decoding means is located within the second dwelling;
   comparing means for comparing a first channel datum from the line-up list with a second channel datum denoting the predetermined channel tuned by the first tuning means, for replacing the first channel datum with the second channel datum if the first and second channel data differ, for comparing a third channel datum from the line-up list with a fourth channel datum denoting the predetermined channel tuned by the second tuning means, and for replacing the third channel datum with the fourth channel datum if the third and fourth channel data differ, wherein the first channel datum denotes a channel corresponding to a source identification code, wherein the second channel datum denotes the predetermined channel tuned by the first tuning means, wherein the third channel datum denotes a channel corresponding to a source identification code, and wherein the fourth channel datum denotes the predetermined channel tuned by the second tuning means.

42. The audience measurement system of claim 41 wherein:
   the comparing means comprises first and second comparing means;
   the first comparing means is located within the first dwelling;
   the first comparing means compares the first channel datum from the line-up list with the second channel datum denoting the predetermined channel tuned by the first tuning means;
   the first comparing means replaces the first channel datum with the second channel datum if the first and second channel data differ;

the second comparing means is located within the second dwelling;

the second comparing means compares the third channel datum from the line-up list with the fourth channel datum denoting the predetermined channel tuned by the second tuning means; and, the second comparing means replaces the third channel datum with the fourth channel datum if the third and fourth channel data differ.

43. The audience measurement system of claim 42 wherein:

the source identification codes contained in the line-up list are transmitted in signals at a first time;

the first tuning means tunes a predetermined channel at a second time which is subsequent to the first time;

the first decoding means decodes a source identification code from a signal on the predetermined channel tuned by the first tuning means at the second time;

the second tuning means tunes a predetermined channel at a third time which is subsequent to the first time; and, the second decoding means decodes a source identification code from a signal on the predetermined channel tuned by the second tuning means at the third time.

44. The audience measurement system of claim 43 wherein:

the first comparing means compares the first channel datum from the line-up list with the second channel datum denoting the predetermined channel tuned by the first tuning means and replaces the first channel datum with the second channel datum if the first and second channel data differ and if the source identification code linked to the first channel datum matches the source identification code decoded by the first decoding means from the signal on the predetermined channel tuned by the first tuning means; and, the second comparing means compares the third channel datum from the line-up list with the fourth channel datum denoting the predetermined channel tuned by the second tuning means and replaces the third channel datum with the fourth channel datum if the third and fourth channel data differ and if the source identification code linked to the third channel datum matches the source identification code decoded by the second decoding means from the signal on the predetermined channel tuned by the second tuning means.

45. The audience measurement system of claim 43 wherein the first and second times are the same times.

46. The audience measurement system of claim 41 wherein:

the comparing means compares the first channel datum from the line-up list with the second channel datum denoting the predetermined channel tuned by the first tuning means and replaces the first channel datum with the second channel datum if the first and second channel data differ and if the source identification code linked to the first channel datum matches the source identification code decoded by the first decoding means from the signal on the predetermined channel tuned by the first tuning means; and, the comparing means compares the third channel datum from the line-up list with the fourth channel datum denoting the predetermined channel tuned by the second tuning means and replaces the third channel datum with the fourth channel datum if the third and fourth channel data differ and if the source identification code linked to the third channel datum matches the source identification code decoded by the second decoding means from the signal on the predetermined channel tuned by the second tuning means.

47. The audience measurement system of claim 41 wherein:

the storing means comprises first storing means for storing a first line-up list, wherein the first line-up list links source identification codes with corresponding channel data, and wherein the first storing means is located in the first dwelling;

the storing means comprises second storing means for storing a second line-up list, wherein the second line-up list links source identification codes with corresponding channel data, and wherein the second storing means is located in the second dwelling;

the first tuning means tunes a first predetermined channel;

the first decoding means decodes a source identification code from a signal on the first predetermined channel;

the second tuning means tunes a second predetermined channel;

the second decoding means decodes a source identification code from a signal on the second predetermined channel;

the comparing means compares a first channel datum from the first line-up list with a second channel datum denoting the first predetermined channel, replaces the first channel datum in the first line-up list with the second channel datum if the first and second channel data differ, compares a third channel datum from the second line-up list with a fourth channel datum denoting the second predetermined channel, and replaces the third channel datum in the second line-up list with the fourth channel datum if the third and fourth channel data differ.

48. The audience measurement system of claim 47 wherein the first and second predetermined channels are the same predetermined channel.

49. The audience measurement system of claim 47 wherein the first and second predetermined channels are different predetermined channels.

50. The audience measurement system of claim 47 wherein:

the comparing means comprises first and second comparing means;

the first comparing means is located within the first dwelling;

the first comparing means compares the first channel datum from the first line-up list with the second channel datum denoting the first predetermined channel;

the first comparing means replaces the first channel datum with the second channel datum if the first and second channel data differ;

the second comparing means is located within the second dwelling;

the second comparing means compares the third channel datum from the second line-up list with the fourth channel datum denoting the second predetermined channel; and, the second comparing means replaces the third channel datum with the fourth channel datum if the third and fourth channel data differ.

51. The audience measurement system of claim 50 wherein:

the source identification codes contained in the first line-up list are transmitted in signals at a first time;

the source identification codes contained in the second line-up list are transmitted in signals at a second time;

the first tuning means tunes the first predetermined channel at a third time which is subsequent to the first time;

the first decoding means decodes a source identification code from a signal on the first predetermined channel tuned by the first tuning means at the third time;

the second tuning means tunes the second predetermined channel at a fourth time which is subsequent to the second time; and, the second decoding means decodes a source identification code from a signal on the second predetermined channel tuned by the second tuning means at the fourth time.

52. The audience measurement system of claim 51 wherein:

the first comparing means compares the first channel datum from the first line-up list with the second channel datum denoting the first predetermined channel and replaces the first channel datum with the second channel datum if the first and second channel data differ and if the source identification code linked to the first channel datum matches the source identification code decoded by the first decoding means from the signal on the first predetermined channel; and, the second comparing means compares the third channel datum from the second line-up list with the fourth channel datum denoting the second predetermined channel and replaces the third channel datum with the fourth channel datum if the third and fourth channel data differ and if the source identification code linked to the third channel datum matches the source identification code decoded by the second decoding means from the signal on the second predetermined channel.

53. The audience measurement system of claim 52 wherein the first and third times are the same times, and wherein the second and fourth times are the same times.

54. The audience measurement system of claim 52 wherein the first and second predetermined channels are the same predetermined channel.

55. The audience measurement system of claim 52 wherein the first and second predetermined channels are different predetermined channels.

56. The audience measurement system of claim 41 wherein:

the storing means comprises first storing means for storing a first line-up list, wherein the first line-up list links a first source identification code with a first predetermined channel, and wherein the first storing means is located in the first dwelling;

the storing means comprises second storing means for storing a second line-up list, wherein the second line-up list links the first source identification code with the first predetermined channel, and wherein the second storing means is located in the second dwelling;

the first tuning means tunes the first predetermined channel;

the first decoding means decodes the first source identification code from a signal on the first predetermined channel;

the second tuning means tunes the first predetermined channel;

the second decoding means decodes the first source identification code from a signal on the first predetermined channel;

the comparing means is located at a central office, the comparing means compares the first source identification code decoded by the first decoding means to the first source identification code linked with the first predetermined channel in the first line-up list, and the comparing means replaces the first predetermined channel which is linked to the first source identification code in the second line-up list with the first predetermined channel decoded by the first decoding means if the first source identification code decoded by the first decoding means differs from the first source identification code linked with the first predetermined channel in the first line-up list.

57. The audience measurement system of claim 41 wherein:

the storing means stores a first line-up list, wherein the first line-up list links a first source identification code with a first predetermined channel;

the storing means stores a second line-up list, wherein the second line-up list links the first source identification code with the first predetermined channel;

the first tuning means tunes the first predetermined channel;

the first decoding means decodes the first source identification code from a signal on the first predetermined channel;

the second tuning means tunes the first predetermined channel;

the second decoding means decodes the first source identification code from a signal on the first predetermined channel; and, the comparing means compares the first source identification code decoded by the first decoding means to the first source identification code linked with the first predetermined channel in the first line-up list, and the comparing means replaces the first predetermined channel which is linked to the first source identification code in the second line-up list with the first predetermined channel decoded by the first decoding means if the first source identification code decoded by the first decoding means differs from the first source identification code linked with the first predetermined channel in the first line-up list.

58. A method of determining to which signal of a plurality of signals a receiver in a statistically selected dwelling is tuned, wherein the dwelling has a service entrance at which a plurality of channels carrying the plurality of signals enter the dwelling, and wherein each signal of the plurality of signals is transmitted with a corresponding source identification code, the method comprising the steps of:

a) storing a set of paired records, wherein a first record of each of the paired records comprises a source identification code, and wherein a second record of each of the paired records comprises a corresponding channel designation;

b) inserting a local code in each of the plurality of signals at the service entrance, wherein each local code comprises a channel designation uniquely associated with the channel carrying a corresponding signal;

c) decoding the source identification code and the local code from signal to which the receiver is tuned;

d) comparing the decoded source identification code with each of the first records of each set of paired records to find a matching first record; and, e) replacing the second record corresponding to a matched first record with the channel designation of the decoded local code if the second record corresponding to the matched first record does not match the channel designation of the decoded local code.

59. The method of claim 58 wherein step a) comprises the step of storing the set of paired records in a central office, and wherein steps d) and e) are executed by a computer in the central office.

60. The method of claim 59 wherein the set of records is a first set of paired records, wherein the dwelling is a first dwelling, and wherein the method further comprises the steps of:

f) storing a second set of paired records in a second dwelling, wherein a first record of each of the paired records in the second set of paired records comprises a source identification code, and wherein the second record of each of the paired records in the second set of paired records comprises a corresponding channel designation; and, g) replacing, in the second set of paired records stored in the second dwelling, the second record, which is in the second set of paired records and which corresponds to the matched first record, with the channel designation of the decoded local code if the second record, which is in the first set of paired records and which corresponds to the matched first record, does not match the channel designation of the decoded local code.

61. The method of claim 58 wherein the set of paired records is stored in a computer memory within the dwelling, and wherein the steps d) and e) are executed by a computer operatively connected to the computer memory.

62. An audience measurement system for metering tuning of a receiver which receives a plurality of program signals, wherein the receiver is located at an audience site within a dwelling, and wherein the plurality of program signals enter the dwelling at a service entrance and are supplied therefrom to the audience site, the audience measurement system comprising:

code inserting means for inserting a unique local code inserter ID in each of the program signals, wherein the code inserting means is located near the service entrance;

decoding means for decoding the unique local code inserter ID, wherein the decoding means is located in the audience site; and, collecting and storing means within the dwelling for collecting and storing the decoded unique local code inserter ID.

63. The audience measurement system of claim 62 wherein the unique local code inserter ID inserted by the code inserting means further includes a channel number indicative of a channel corresponding to a program signal to which the unique local code inserter ID is inserted.

64. The audience measurement system of claim 62 wherein the code inserting means further comprises active channel determining means for determining active channels, and wherein the code inserting means is arranged to insert the code on each of the active channels.

* * * * *